US012537058B2

(12) United States Patent
Heo et al.

(10) Patent No.: US 12,537,058 B2
(45) Date of Patent: Jan. 27, 2026

(54) MEMORY DEVICES HAVING BUILT-IN POWER SUPPORTING CONTROL CIRCUITS THAT PROVIDE INCREASED PROGRAM AND READ RELIABILITY

(71) Applicant: Samsung Electronics Co., Ltd., Suwon-si (KR)

(72) Inventors: Kwanghoe Heo, Suwon-si (KR); Seongjin Kim, Suwon-si (KR); Sang-Wan Nam, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 2 days.

(21) Appl. No.: 18/637,829

(22) Filed: Apr. 17, 2024

(65) Prior Publication Data

US 2025/0124983 A1    Apr. 17, 2025

(30) Foreign Application Priority Data

Oct. 11, 2023  (KR) .................. 10-2023-0134840

(51) Int. Cl.
| | |
|---|---|
| *G11C 16/34* | (2006.01) |
| *G11C 16/04* | (2006.01) |
| *G11C 16/08* | (2006.01) |
| *G11C 16/10* | (2006.01) |
| *G11C 16/26* | (2006.01) |
| *G11C 16/30* | (2006.01) |

(52) U.S. Cl.
CPC .......... *G11C 16/08* (2013.01); *G11C 16/0483* (2013.01); *G11C 16/10* (2013.01); *G11C 16/26* (2013.01); *G11C 16/30* (2013.01)

(58) Field of Classification Search
CPC ................................ G11C 16/34; G11C 11/56
See application file for complete search history.

(56) References Cited

U.S. PATENT DOCUMENTS

| | | | |
|---|---|---|---|
| 7,706,204 | B2 | 4/2010 | Choi et al. |
| 8,964,488 | B2 | 2/2015 | Kim et al. |
| 9,374,092 | B2 | 6/2016 | Jeong |
| 9,575,527 | B2 | 2/2017 | Stickel et al. |
| 9,576,675 | B2 | 2/2017 | Kim et al. |

(Continued)

*Primary Examiner* — Jason Lappas
(74) *Attorney, Agent, or Firm* — Wolf, Greenfield & Sacks, P.C.

(57) ABSTRACT

A memory device includes an array of nonvolatile memory cells and a wordline voltage generator configured to drive: a selected word line within the array with a program voltage, a word line extending immediately adjacent the selected word line with a first voltage during the program operation, and an unselected word line within the array with a second voltage having a magnitude less than a magnitude of the first voltage, during a memory cell program operation. A control block is provided, which drives the wordline voltage generator with a first internal power signal having a first magnitude, in response to a first external supply power signal, drives the wordline voltage generator with a second internal power signal having a second magnitude less than the first magnitude, and selectively redirects power from the first external supply power signal to the second internal power signal, in response to detecting a reduction in current and/or voltage associated with the second external power signal that exceeds a threshold amount.

19 Claims, 12 Drawing Sheets

(56) References Cited

U.S. PATENT DOCUMENTS

| | | |
|---|---|---|
| 9,690,317 B2 | 6/2017 | Im et al. |
| 2010/0191987 A1 | 7/2010 | Furutani et al. |
| 2019/0171381 A1* | 6/2019 | Ioannou ................ G06F 3/0679 |
| 2021/0026545 A1 | 1/2021 | Cheng et al. |

* cited by examiner

MEMORY DEVICES HAVING BUILT-IN POWER SUPPORTING CONTROL CIRCUITS THAT PROVIDE INCREASED PROGRAM AND READ RELIABILITY

REFERENCE TO PRIORITY APPLICATION

This application claims priority under 35 U.S.C. § 119 to Korean Patent Application No. 10-2023-0134840, filed Oct. 11, 2023, the disclosure of which is hereby incorporated herein by reference.

BACKGROUND

Example embodiments of the present disclosure described herein relate to semiconductor memory devices and, more particularly, to storage devices with power management control circuitry therein.

A semiconductor memory may be mainly classified as a volatile memory or a non-volatile memory. Read and write speeds of a volatile memory, such as a DRAM or SRAM are typically fast, but the data stored therein is automatically erased when power is turned off. In contrast, a non-volatile memory may retain data even when power is turned off. Thus, non-volatile memories may be used to store contents that must be preserved regardless of whether power is supplied or not.

A representative example of a non-volatile memory is a flash memory. As will be understood by those skilled in the art, technologies for stacking memory cells in three dimensions, such as vertical flash memory (3D NAND), are being actively researched to improve integration. In a vertical flash memory, the number of wordlines stacked vertically typically increases with each new generation. In addition, the number of string selection lines formed in a top gate layer also increases. And, as the number of wordline stages of the flash memory increases, an amount of current required to operate the flash memory also increases.

SUMMARY

Example embodiments of the present disclosure provide a storage device including a memory device, which supplies a plurality of internal powers through a plurality of external supply powers when a current of one of the plurality of external supply powers is insufficient. The memory device supplements an insufficient external supply power through the remaining external supply power; a power management method is also provided.

According to example embodiments, a memory device includes: a memory cell array including a plurality of memory cells connected to a selected wordline, an adjacent wordline adjacent to the selected wordline, and an unselected wordline. A wordline voltage generator is provided, which supplies a first voltage to the adjacent wordline and a second voltage to the unselected wordline during a program operation or read operation. A control block is provided, which receives a first external supply power having a first supply power voltage and a second external supply power having a second supply power voltage from a memory controller, and provides a first internal power corresponding to the first external supply power to generate the first voltage and a second internal power corresponding to the second external supply power to generate the second voltage to the wordline voltage generator. Advantageously, the control block provides additional supply power generated based on the first external supply power to the second internal power when a current amount (or voltage amount) of the second external supply power decreases as smaller than a specified amount.

According to additional embodiments, a storage device includes: a memory device including a selected wordline, an adjacent wordline adjacent to the selected wordline, and an unselected wordline. The storage device provides a first voltage corresponding to a first internal power to the adjacent wordline during a program operation or read operation, and provides a second voltage corresponding to a second internal power to the unselected word. A memory controller provides a first supply power corresponding to the first internal power and a second supply power corresponding to the second internal power to the memory device. The memory controller provides additional supply power generated based on the first supply power to an output pad of the second supply power when a current amount of the second supply power decreases as smaller than a specified amount during a program operation or read operation.

According to further embodiments, a power management method of a memory device includes: providing a first internal power corresponding to a first external power to an adjacent wordline based on the first external power and a second external power received from the memory controller, and a second internal power corresponding to the second external power to an unselected wordline during a program operation or read operation; comparing a current of the second external power with a reference current; and providing additional power generated based on the first external power to the second internal power when the current of the second external power is smaller than the reference current. A first power voltage of the first external power is set to be different from a second power voltage of the second external power. A third power voltage of the additional power is set to be different from the first power voltage.

BRIEF DESCRIPTION OF THE FIGURES

The above and other objects and features of the present disclosure will become apparent by describing in detail embodiments thereof with reference to the accompanying drawings.

DETAILED DESCRIPTION OF EMBODIMENTS

Below, example embodiments of the present disclosure will be described in detail and clearly to such an extent that one of ordinary skill in the art may readily implement the inventive concepts.

Figure 1:
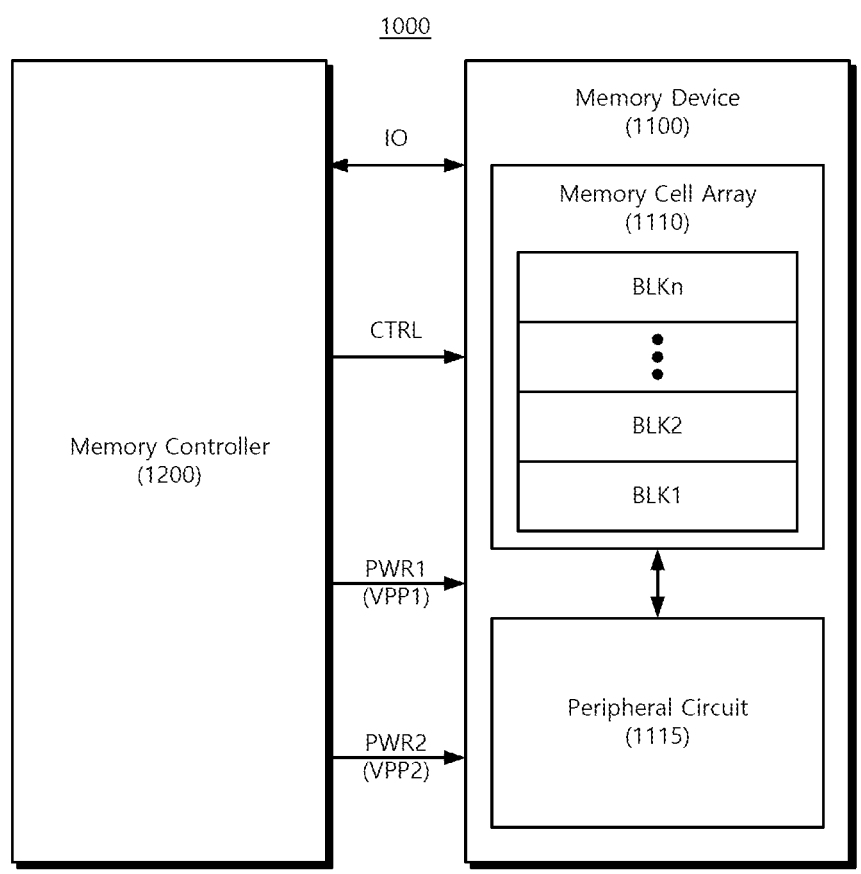
FIG. 1 is a block diagram illustrating a storage device according to an example embodiment of the present disclosure.

FIG. 1 is a block diagram illustrating a storage device according to an example embodiment of the present disclosure. Referring to FIG. 1, the storage device 1000 may include a memory device 1100 and a memory controller 1200; and, the memory device 1100 may receive input/output signals IO from the memory controller 1200 through input/output lines, receive control signals CTRL through control lines, and receive external supply power through power lines. According to some embodiments, the external supply power may include a first external supply power PWR1 and a second external supply power PWR2; the first external supply power PWR1 may have a first supply power voltage VPP1 (for example, 11V), whereas the second external supply power PWR2 may have a second supply power voltage VPP2 (for example, 8V), which is lower than the first supply power voltage VPP1. The storage device 1000 may store data in the memory device 1100 through control of the memory controller 1200.

According to an example embodiment, the memory device 1100 may include a memory cell array 1110 and a peripheral circuit 1115. The memory cell array 1110 may have a planar 2D structure or a vertical 3D structure. The memory cell array 1110 may include a plurality of memory cells, which store single-bit data or multi-bit data.

According to an example embodiment, the memory cell array 1110 may be located (for example, disposed) next to or above the peripheral circuit 1115 in terms of the design layout structure. A structure in which the memory cell array 1110 is positioned over the peripheral circuit 1115 may be referred to as a cell on peripheral (COP) structure. The memory cell array 1110 may be manufactured as a chip separate from the peripheral circuit 1115. An upper chip including the memory cell array 1110 and a lower chip including the peripheral circuit 1115 may be connected to each other by a bonding method. Such a structure may be referred to as a chip-to-chip (C2C) structure.

In addition, the peripheral circuit 1115 may include analog circuits and/or digital circuits required to store data in the memory cell array 1110 or read data stored in the memory cell array 1110. The peripheral circuit 1115 may receive the external power PWR through power lines and generate internal powers of various levels. The peripheral circuit 1115 may also receive commands, addresses, and/or data from the memory controller 1200 through input/output lines. The peripheral circuit 1115 may store data in the memory cell array 1110 according to the control signals CTRL. Alternatively or additionally, the peripheral circuit 1115 may read data stored in the memory cell array 1110 and provide the read data to the memory controller 1200.

Figure 2:
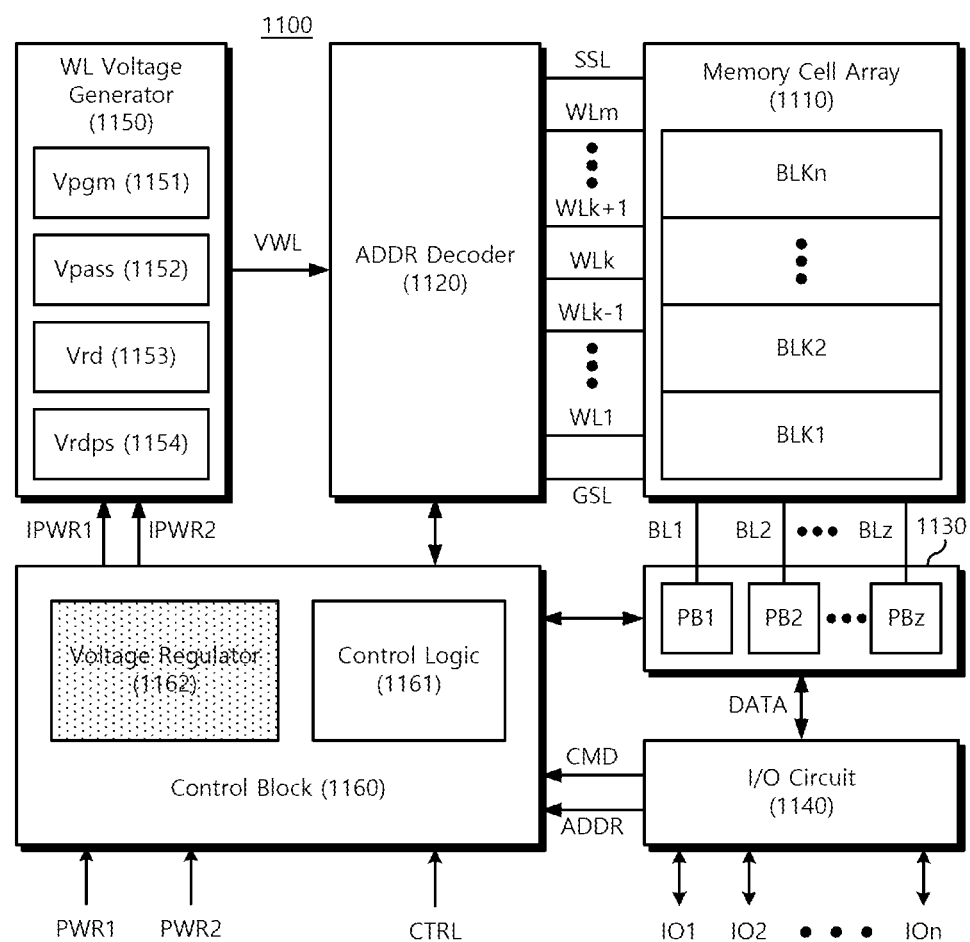
FIG. 2 is a block diagram illustrating the memory device illustrated in FIG. 1.

FIG. 2 is a block diagram illustrating as an example embodiment of the memory device 1100 illustrated in FIG. 1. The storage device 1000 of FIG. 1 may be a flash storage device based on a flash memory. For example, the storage device 1000 may be implemented as a solid state drive (SSD), a universal flash storage (UFS), a memory card, or the like. Referring to FIGS. 1 and 2, The memory device 1100 may include the memory cell array 1110 and the peripheral circuit 1115 (see FIG. 1). The peripheral circuit 1115 may include an address decoder 1120, a page buffer circuit 1130, a input/output circuit 1140, a wordline voltage generator 1150, and a control block 1160.

According to an example embodiment, the memory cell array 1110 may include a plurality of memory blocks BLK1 to BLKn. Each memory block may be composed of a plurality of pages, and each page may include a plurality of memory cells. Each memory cell may store multi-bit data (for example, two or more bits). Each memory block may correspond to an erase unit, and each page may correspond to a read and/or write unit.

According to an example embodiment, the memory cell array 1110 may be formed in a direction perpendicular to a substrate. A gate electrode layer and an insulation layer may be alternately deposited on the substrate. Each memory block (for example, BLK1) may be connected to one or more string selection lines SSL, a plurality of wordlines WL1 to WLm, and one or more ground selection lines GSL. WLk is a selected wordline sWL and the remaining wordlines (WL1 to WLk−1, WLk+1 to WLm) are unselected wordlines uWL.

According to an example embodiment, the address decoder 1120 may be connected to the memory cell array 1110 through selection lines SSL and GSL and wordlines WL1 to WLm. The address decoder 1120 may select a wordline during a program or read operation. The address decoder 1120 may receive the wordline voltage VWL from the wordline voltage generator 1150 and provide a program voltage or read voltage to the selected wordline.

According to an example embodiment, the page buffer circuit 1130 may be connected to the memory cell array 1110 through bitlines BL1 to BLz. The page buffer circuit 1130 may temporarily store data to be stored in the memory cell array 1110 or data read from the memory cell array 1110. The page buffer circuit 1130 may include page buffers PB1 to PBz connected to respective bitlines. Each page buffer may include a plurality of latches to store or read multi-bit data.

According to an example embodiment, the input/output circuit 1140 may be internally connected to the page buffer circuit 1130 through data lines and externally connected to the memory controller (referring to FIG. 1, 1200) through the input/output lines IO1 to IOn. The input/output circuit 1140 may receive program data from the memory controller 1200 during a program operation. In addition, the input/output circuit 1140 may provide data read from the memory cell array 1110 to the memory controller 1200 during a read operation.

According to an example embodiment, the wordline voltage generator 1150 may receive first and second internal power signals IPWR1 and IPWR2 from the control block 1160 and generate a wordline voltage VWL required to read or write data. The wordline voltage VWL may be provided to a selected wordline sWL, adjacent wordlines aWL or unselected wordlines uWL through the address decoder 1120. In some embodiments, the wordline voltage generator 1150 may include a program voltage generator 1151, an adjacent pass voltage generator 1152, a read voltage generator 1153 and an unselected pass voltage generator 1154.

According to an example embodiment, the program voltage generator 1151 may generate a program voltage Vpgm provided to the selected wordline sWL during a program operation. The adjacent pass voltage generator 1152 may generate an adjacent pass voltage Vpass provided to the adjacent wordlines aWL. The unselected pass voltage generator 1154 may generate an unselected pass voltage Vrdps provided to the unselected wordlines uWL. The unselected pass voltage Vrdps may be a voltage sufficient to turn on memory cells connected to the unselected wordlines uWL during the program operation.

According to an example embodiment, the read voltage generator 1153 may generate a selected read voltage Vrd provided to the selected wordline sWL during a read operation. The unselected pass voltage generator 1154 may generate an unselected pass voltage Vrdps provided to the unselected wordlines uWL. The unselected pass voltage Vrdps may be a voltage sufficient to turn on memory cells connected to the unselected wordlines uWL during the read operation.

According to an example embodiment, the control block 1160 may control an overall operation of the memory device 1100. The control block 1160 may receive commands CMD, addresses ADDR, and control signals CTRL provided from the memory controller 1200. In addition, the control block 1160 may be provided with external power supply signals PWR1 and PWR2 through power lines. As an example, the control block 1160 may include control logic 1161 and a voltage regulator 1162.

According to an example embodiment, the control block 1160 may receive external supply power from the memory controller 1200 through power lines. As an example, the external supply power may include a first external supply power signal PWR1 and a second external supply power signal PWR2. The first external supply power signal PWR1 may have a first supply power voltage VPP1 (for example, 11V), whereas the second external supply power signal PWR2 may have a second supply power voltage VPP2 (for example, 8V) which is lower than the first supply power voltage VPP1. The control block 1160 may provide internal power signals having a first supply power voltage VPP1 or a second supply power voltage VPP2 to the wordline voltage generator 1150. As an example, the control block 1160 may provide the first external supply power signal PWR1 to the first internal power signal IPWR1. The control block 1160 may provide the second external supply power signal PWR2 to the second internal power signal IPWR2.

According to an example embodiment, the control logic 1161 may use commands CMD, addresses ADDR, and control signals CTRL provided from the memory controller 1200 to control a read operation, a write operation, and an erase operation of the memory device 1100. The addresses ADDR may include a block selection address for selecting one memory block, a row address for selecting one page, and a column address for selecting one memory cell.

According to an example embodiment, the voltage regulator 1162 may supplement the second internal power signal IPWR2 by changing a voltage of the first external supply power signal PWR1. As an example, the voltage regulator 1162 may receive the first external supply power PWR1 and output a third internal power signal having the second supply power voltage VPP2. The voltage regulator 1162 may provide the third internal power signal having the second power source voltage VPP2 to the second internal power signal IPWR2.

According to an example embodiment, the voltage regulator 1162 may have an on or off state. When the voltage regulator 1162 is in the off state, the third internal power signal may not be provided to the second internal power signal IPWR2. When the voltage regulator 1162 is in the on state, the third internal power signal may be provided to the second internal power signal IPWR2.

Figure 3:
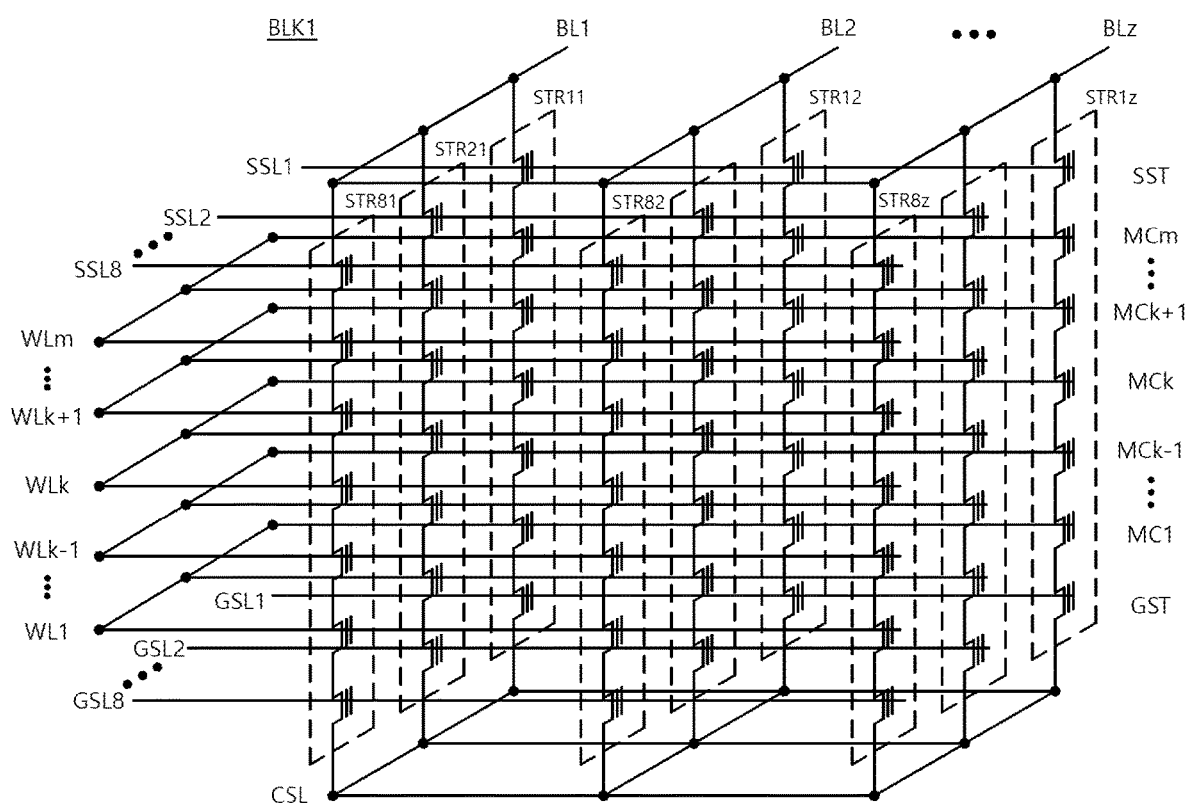
FIG. 3 is a circuit diagram illustrating an example embodiment of a memory block BLK1 of the memory cell array illustrated in FIG. 2.

FIG. 3 is a circuit diagram illustrating an example embodiment of a memory block BLK1 of the memory cell array illustrated in FIG. 2. Referring to FIG. 3, in the memory block BLK1, a plurality of cell strings STR11 to STR8z may be formed between the bitlines BL1 to BLz and a common source line CSL. Each cell string includes a string selection transistor SST, a plurality of memory cells MC1 to MCm, and a ground selection transistor GST. According to an example embodiment, the string selection transistors SST may be connected with string selection lines SSL1 to SSL8. The ground selection transistors GST may be connected with ground selection lines GSL1 to GSL8. The string selection transistors SST may be connected with the bitlines BL1 to BLz, and the ground selection transistors GST may be connected with the common source line CSL. The first to m-th wordlines WL1 to WLm may be connected with the plurality of memory cells MC1 to MCm in a row direction. The first to z-th bitlines BL1 to BLz may be connected with the plurality of memory cells MC1 to MCm in a column direction. First to z-th page buffers PB1 to PBz may be connected with the first to z-th bitlines BL1 to BLZ.

According to an example embodiment, the first wordline WL1 may be placed above the first to eighth ground selection lines GSL1 to GSL8. The first memory cells MC1 that are placed at the same height from the substrate may be connected with the first wordline WL1. The m-th wordline WLm may be placed below the string selection lines SSL1 to SSL8. The m-th memory cells MCm that are placed at the same height from the substrate may be connected with the m-th wordline WLm. In a similar manner, the second to m-th memory cells MC2 to MCm that are placed at the same heights from the substrate may be respectively connected with the second to m-th wordlines WL2 to WLm.

Figure 4:
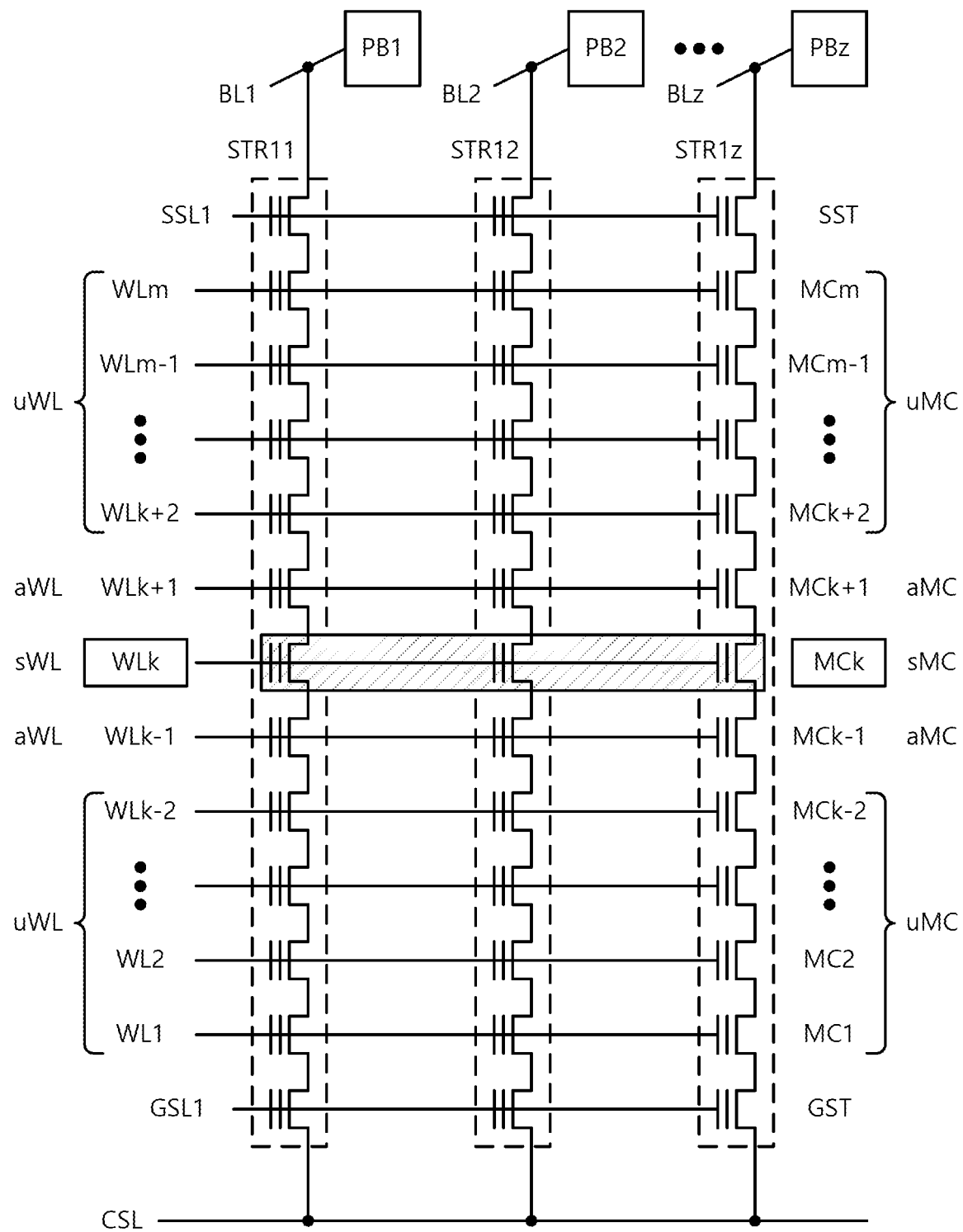
FIG. 4 is a circuit diagram illustrating cell strings selected by the first string selection line SSL1 from among the cell strings of the memory block BLK1 illustrated in FIG. 3.

FIG. 4 is a circuit diagram illustrating cell strings selected by the first string selection line SSL1 from among the cell strings of the memory block BLK1 illustrated in FIG. 3. The 11th to 1z cell strings STR11 to STR1z may be selected by the first string selection line SSL1. The eleventh to 1z cell strings STR11 to STR1z may be connected to the first to z-th bitlines BL1 to BLz, respectively. The first to z-th page buffers PB1 to PBz may be connected to the first to z-th bitlines BL1 to BLz, respectively. According to an example embodiment, the eleventh cell string STR11 may be connected to the first bitline BL1 and the common source line CSL. The eleventh cell string STR11 may include string selection transistors SST selected by the first string selection line SSL1, first to m-th memory cells MC1 to MCm connected to the first to m-th wordlines WL1 to WLm, and ground selection transistors GST selected by the first ground selection line GSL1. The twelfth cell string STR12 may be connected to the second bitline BL2 and the common source line CSL. The 1z cell string STR1z may be connected to the z-th bitline BLz and the common source line CSL.

According to an example embodiment, the first wordline WL1 and the m-th wordline WLm may be edge wordlines (edge WL). The second wordline WL2 and the (m−1)-th wordline WLm−1 may be edge adjacent wordlines (edge adjacent WL). The k-th wordline WLk may be a selected wordline. The (k−1)-th wordline WLk−1 and the (k+1)-th wordline WLk+1 may be wordlines adjacent to the selected wordline. If the k-th wordline WLk is the selected wordline sWL, the (k−1)-th wordline WLk−1 and the (k+1)-th wordline WLk+1 may be adjacent wordlines aWL, and the remaining wordlines WL1 to WLk−2 and WLk+2 to WLm may be unselected wordlines uWL.

According to an example embodiment, the first memory cells MC1 and the m-th memory cells MCm may be edge memory cells. The second memory cells MC2 and the (m−1)-th memory cells MCm−1 may be edge adjacent memory cells. The k-th memory cells MCK may be selected memory cells sMC. The (k−1)-th memory cells MCK−1 and the (k+1)-th memory cells MCk+1 may be memory cells adjacent to the selected memory cells (hereafter, adjacent memory cells aMC). If the k-th memory cells MCK are selected memory cells sMC, the remaining memory cells MC1 to MCk−2 and MCk+2 to MCm may be unselected memory cells uMC.

Figure 5:
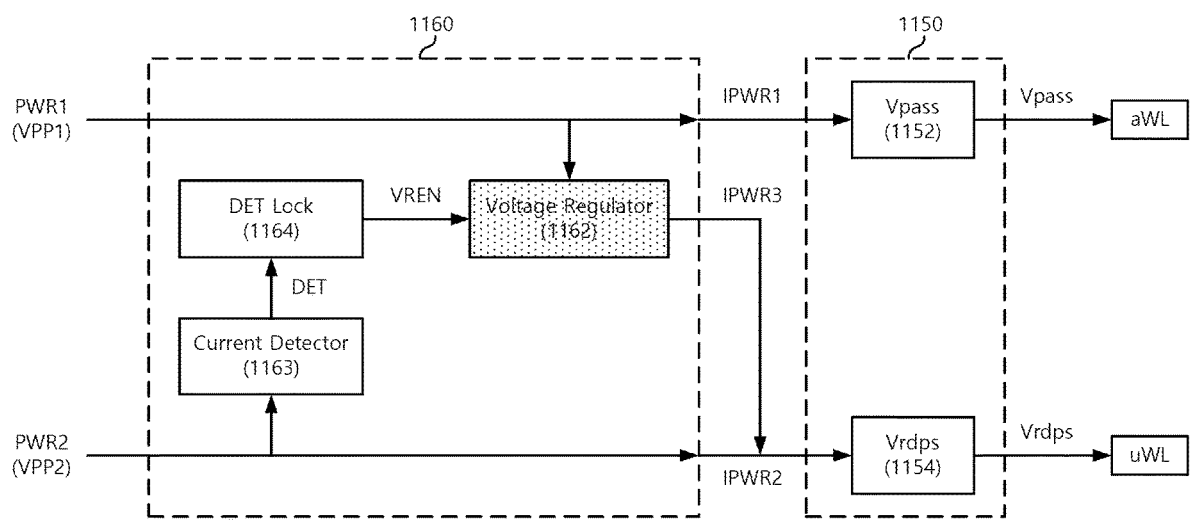
FIG. 5 is a diagram illustrating an example of a power supplement operation during a program operation or a read operation in the memory device of FIG. 2.

FIG. 5 is a diagram illustrating an example of a power supplement operation during a program operation or a read operation in the memory device of FIG. 2. Referring to FIGS. 2, 4, and 5, the control block 1160 may receive a first external supply power signal PWR1 and a second external supply power signal PWR2 from the memory controller 1200. According to an example embodiment, the control block 1160 may receive the first external supply power signal PWR1 and the second external supply power signal PWR2 from the memory controller 1200. The control block 1160 may provide the first external supply power signal PWR1 as the first internal power signal IPWR1; similarly, the control block 1160 may provide the second external supply power signal PWR2 as the second internal power signal IPWR2. The first external supply power signal PWR1 may have a first supply power voltage VPP1 (for example, 11V). The second external supply power signal PWR2 may have a second supply power voltage VPP2 (for example, 8V) which is lower than the first supply power voltage VPP1.

According to an example embodiment, during a program operation, the program voltage generator 1151 of the wordline voltage generator 1150 may generate a program voltage Vpgm provided to the selected wordline sWL. The adjacent pass voltage generator 1152 of the wordline voltage generator 1150 may generate an adjacent pass voltage Vpass provided to the adjacent wordlines aWL. The unselected pass voltage generator 1154 may generate an unselected pass voltage Vrdps provided to the unselected wordlines uWL. The unselected pass voltage Vrdps may be set lower than the adjacent pass voltage Vpass.

According to an example embodiment, the unselected wordlines uWL include a greater number of wordlines than the adjacent wordlines aWL. Accordingly, the unselected wordlines uWL may consume a greater amount of current than the adjacent wordlines aWL. However, if the total required current is not supplied to the unselected wordlines uWL by the second external supply power signal PWR2, an error may occur during a program operation.

Advantageously, to inhibit this potential problem during a program operation, the control block 1160 may detect whether the second external supply power signal PWR2 is insufficient. The control block 1160 may include a current detector 1163 and a detection signal locker 1164. When a current of the second external supply power signal PWR2 is smaller than a reference current, the current detector 1163 may generate a current shortage detection signal DET. In response, the detection signal locker 1164 may transmit a voltage regulation enable signal VREN to the voltage regulator 1162 based on the current shortage detection signal DET.

According to an example embodiment, when a current amount provided by the second external supply power signal PWR2 is insufficient during a program operation, the control block 1160 may supplement the second external supply power signal PWR2 based on the first external supply power signal PWR1. For example, when the voltage regulation enable signal VREN is not received, the voltage regulator 1162 may remain in the off state. However, when receiving the voltage regulation enable signal VREN, the voltage regulator 1162 may be switched to the on state; and, when switched to the on state, the voltage regulator 1162 may generate a third internal power signal IPWR3 based on the first external supply power signal PWR1 and then provide the third internal power signal IPWR3 as an additional voltage (with additional current support) to the second internal power signal IPWR2. For example, when switched to the on state, the voltage regulator 1162 may receive the first external supply power signal PWR1 having the first supply power voltage VPP1 and output the third internal power signal IPWR3 having the second supply power voltage VPP2.

According to an example embodiment, during a read operation, the read voltage generator 1153 of the wordline voltage generator 1150 may generate a selected read voltage Vrd provided to the selected wordline sWL. The adjacent pass voltage generator 1152 of the wordline voltage generator 1150 may generate an adjacent pass voltage Vpass provided to the adjacent wordlines aWL. The unselected pass voltage generator 1154 may generate an unselected pass voltage Vrdps provided to the unselected wordlines uWL. The unselected pass voltage Vrdps may be set lower than the adjacent pass voltage Vpass, and the selected read voltage Vrd may be set lower than the unselected pass voltage Vrdps.

Moreover, because the unselected wordlines uWL include a greater number of wordlines than the adjacent wordlines aWL, the unselected wordlines uWL may consume a greater amount of current than adjacent wordlines aWL. If required current is not supplied to the unselected wordlines uWL by the second external supply power signal PWR2, an error may occur during a read operation. Advantageously, to inhibit an error during a read operation, the control block 1160 may detect whether the second external supply power signal PWR2 is insufficient. The control block 1160 may include the current detector 1163 and the detection signal locker 1164. When a current of the second external supply power signal PWR2 is smaller than a reference current, the current detector 1163 may generate a current shortage detection signal DET. The detection signal locker 1164 may transmit a voltage regulation enable signal VREN to the voltage regulator 1162 based on the current shortage detection signal DET.

And, when a current amount of the second external supply power signal PWR2 is insufficient during a read operation, the control block 1160 may supplement the second external supply power signal PWR2 based on the first external supply power signal PWR1. For example, when the voltage regulation enable signal VREN is not received, the voltage regulator 1162 may remain in the off state. But, when the voltage regulation enable signal VREN is received, the voltage regulator 1162 may be switched to the on state. When switched to the on state, the voltage regulator 1162 may generate a third internal power signal IPWR3 based on the first external supply power signal PWR1 and provide the third internal power signal IPWR3 to the second internal power signal IPWR2. As an example, when switched to the on state, the voltage regulator 1162 may receive the first external supply power signal PWR1 having the first supply power voltage VPP1 and output the third internal power signal IPWR3 having the second supply power voltage VPP2, as previously described with respect to a program operation.

Thus, when the current amount of the second external supply power signal PWR2 is insufficient during a program operation or a read operation, the control block 1160 may output the third internal power signal IPWR3 based on the first external supply power signal PWR1. The control block 1160 may supplement the second internal power signal IPWR2 with the third internal power signal IPWR3, and the program operation or read operation may be performed normally.

Figure 6:
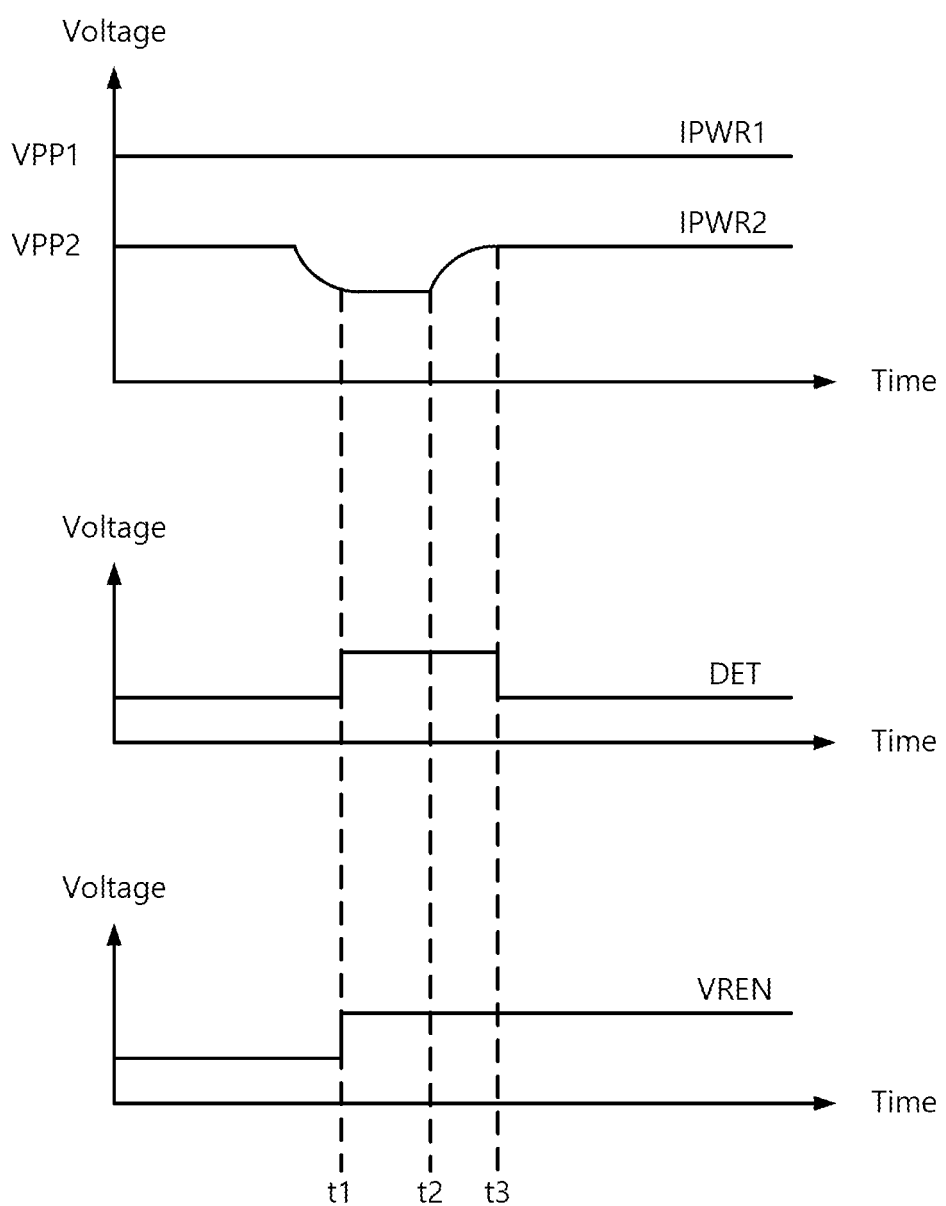
FIG. 6 is a timing diagram illustrating a power supplement method of the voltage regulator of FIG. 5.

FIG. 6 is a timing diagram illustrating a power supplement method of the voltage regulator of FIG. 5. Referring to FIGS. 5 and 6, the voltage regulator 1162 may supplement the second internal power signal IPWR2 based on the voltage regulation enable signal VREN during an operation, such as a program operation or a read operation, etc. As shown, during a program operation or a read operation, the first external supply power signal PWR1 and the second external supply power signal PWR2 may be normally provided before a first time point t1. Accordingly, before the first time point t1, the first internal power signal IPWR1 and the second internal power signal IPWR2 may also be provided normally.

Thereafter, at the first time point t1, the current detector 1163 may detect a current shortage of the second external supply power signal PWR2, or may detect a corresponding reduction in voltage in some alternative embodiments. In response, the current detector 1163 may generate the current shortage detection signal DET, which may be maintained until a third time point t3 when the current amount of the second external supply power signal PWR2 returns to normal, and may be inactivated after the third time point t3.

In addition, at the first time point t1, the detection signal locker 1164 may immediately generate the voltage regulation enable signal VREN based on the current shortage detection signal DET. The detection signal locker 1164 may continue to output the voltage regulation enable signal VREN even after the third time point t3 when the current shortage detection signal DET is inactivated. Accordingly, after the third time point t3, regardless of the current shortage of the second external supply power signal PWR2, the voltage regulator 1162 may continue to supplement the second internal power signal IPWR2 with the third internal power signal IPWR3.

Moreover, in response to a lack of current in the second external supply power signal PWR2, a voltage of the second internal power signal IPWR2 may drop from the first time point t1; and, between the first time point t1 and the second time point t2, the voltage regulator 1162 may begin to supplement the second internal power signal IPWR2 with the third internal power signal IPWR3 so that, at the third time point t3, the second internal power signal IPWR2 may be restored to a normal level (in response to supplementation by the third internal power signal IPWR3). Accordingly, the program operation or read operation of the memory device 1100 may be performed/resumed normally.

Figure 7:
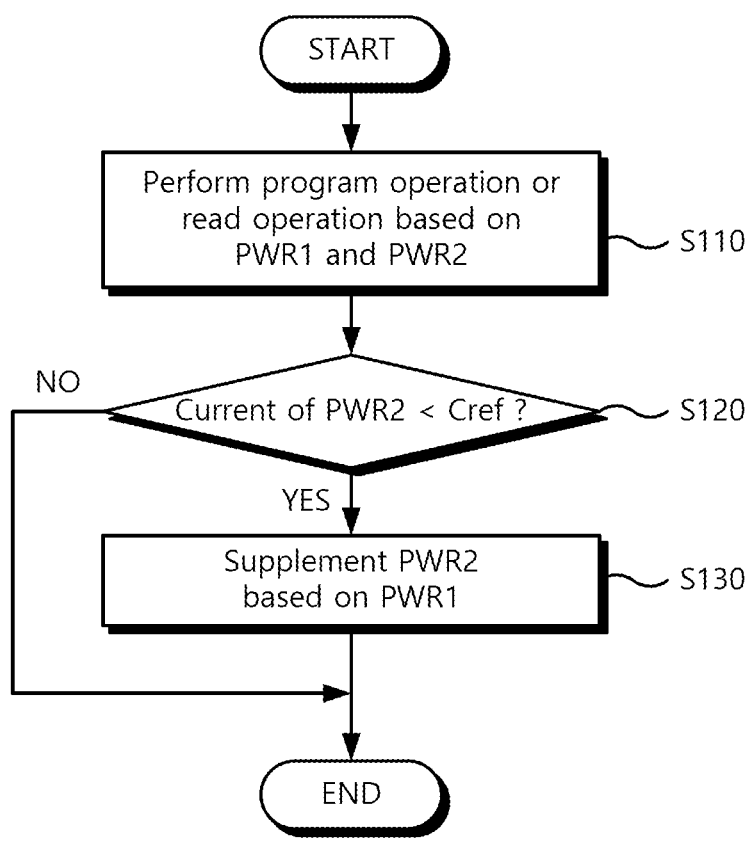
FIG. 7 is a flowchart illustrating a power supplement method during a program operation or a read operation of the memory device of FIG. 2.

FIG. 7 is a flowchart illustrating a power supplement method during a program operation or a read operation of the memory device of FIG. 2. Referring to FIGS. 2 to 7, the memory device 1100 may receive a first external supply power signal PWR1 and a second external supply power signal PWR2 from the memory controller 1200. And, then, in operation S110, the memory device 1100 may perform a program operation or read operation based on the first external supply power signal PWR1 and the second external supply power signal PWR2. For example, the control block 1160 may provide the first external supply power signal PWR1 to the first internal power signal IPWR1. The control block 1160 may provide the second external supply power signal PWR2 to the second internal power signal IPWR2.

The wordline voltage generator 1150 may receive the first internal power signal IPWR1 and the second internal power signal IPWR2 from the control block 1160 and generate the wordline voltage VWL required to read or write data. The wordline voltage VWL may be provided to the selected wordline sWL, adjacent wordlines aWL, or unselected wordlines uWL through the address decoder 1120. The wordline voltage generator 1150 may include the program voltage generator 1151, the adjacent pass voltage generator 1152, the read voltage generator 1153, and the unselected pass voltage generator 1154.

During a program operation, the program voltage generator 1151 may generate a program voltage Vpgm provided to the selection wordline sWL. The adjacent pass voltage generator 1152 may generate an adjacent pass voltage Vpass provided to the adjacent wordlines aWL. The unselected pass voltage generator 1154 may generate an unselected pass voltage Vrdps provided to the unselected wordlines uWL. However, during a read operation, the read voltage generator 1153 may generate a selected read voltage Vrd provided to the select wordline sWL. The unselected pass voltage generator 1154 may generate an unselected pass voltage Vrdps provided to the unselected wordlines uWL.

Next, in operation S120, the memory device 1100 may compare a current of the second external supply power signal PWR2 with a reference current Cref. For example, the current detector 1163 may compare the current of the second external supply power signal PWR2 with the reference current Cref. When the current of the second external supply power signal PWR2 is greater than or equal to the reference current Cref, the memory device 1100 may continue to perform a program operation or a read operation.

But, when the current of the second external supply power signal PWR2 is smaller than the reference current Cref, the current detector 1163 may generate a current shortage detection signal DET. In addition, the detection signal locker 1164 may generate the voltage regulation enable signal VREN based on the current shortage detection signal DET. When the current of the second external supply power signal PWR2 is less than the reference current Cref, the memory device 1100 may perform operation S130.

In operation S130, the memory device 1100 may supplement the second external supply power signal PWR2 based on the first external supply power signal PWR1. For example, when receiving the voltage regulation enable signal VREN, the voltage regulator 1162 may be switched to the on state. When switched to the on state, the voltage regulator 1162 may generate a third internal power signal IPWR3 based on the first external supply power signal PWR1 and provide the third internal power signal IPWR3 to the second internal power signal IPWR2. Accordingly, a current shortage of the second internal power signal IPWR2, which was initially caused by a current shortage of the second external supply power signal PWR2, may be resolved.

Figure 8:
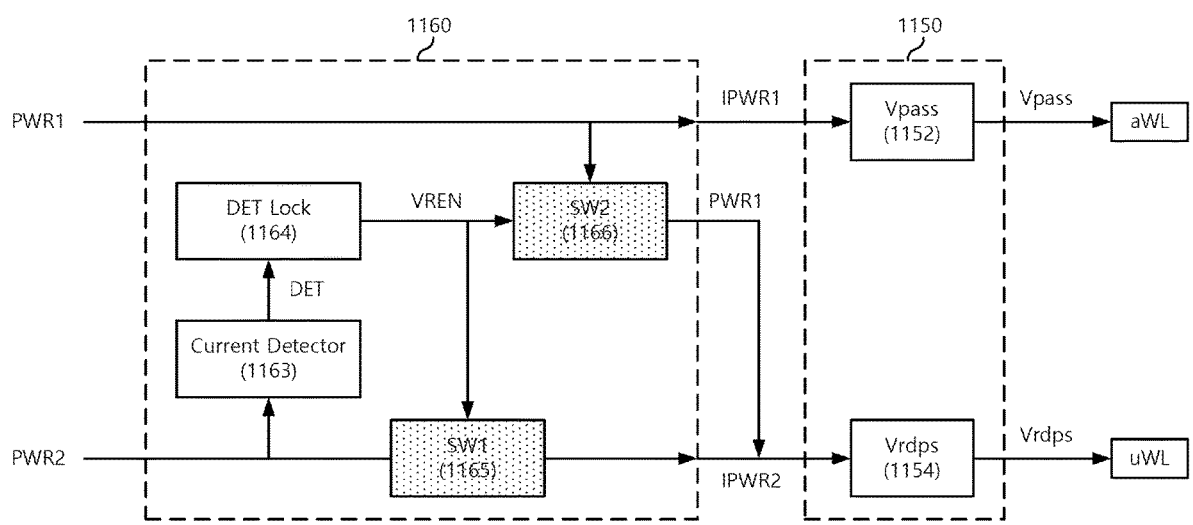
FIG. 8 is a diagram illustrating another example of a power supplement operation during a program operation or a read operation in the memory device of FIG. 2.

FIG. 8 is a diagram illustrating another example of a power supplement operation during a program operation or a read operation in the memory device of FIG. 2. Referring to FIGS. 2, 4, and 8, the control block 1160 may receive a first external supply power signal PWR1 and a second external supply power signal PWR2 from the memory controller 1200. The control block 1160 may provide the first external supply power signal PWR1 directly to a first internal power signal IPWR1, and may indirectly provide the second external supply power signal PWR2 to a second internal power signal IPWR2.

During an operation, such as a program operation, the program voltage generator 1151 of the wordline voltage generator 1150 may generate a program voltage Vpgm provided to the selected wordline sWL. The adjacent pass voltage generator 1152 of the wordline voltage generator 1150 may generate the adjacent pass voltage Vpass provided to the adjacent wordlines aWL. The unselected pass voltage generator 1154 may generate an unselected pass voltage Vrdps provided to the unselected wordlines uWL. The unselected pass voltage Vrdps may be set lower than the adjacent pass voltage Vpass. In addition, the control block 1160 may detect whether the second external supply power signal PWR2 is insufficient. The control block 1160 may include a current detector 1163 (which may be a voltage detector in alternative embodiments) and a detection signal locker 1164. When a current of the second external supply power signal PWR2 is smaller than a reference current, the current detector 1163 may generate a current shortage detection signal DET. The detection signal locker 1164 may generate a voltage regulation enable signal VREN based on the current shortage detection signal DET.

As shown in FIG. 8, the second external supply power signal PWR2 may be provided as a second internal power signal IPWR2 via a first switch 1165. Moreover, when the voltage regulation enable signal VREN is in an inactive state, the first switch SW1 1165 may remain in an on state, but when the voltage regulation enable signal VREN changes to an active state, the first switch SW1 1165 may be switched to an off state, and the second external supply power signal PWR2 may be blocked.

In addition, when the voltage regulation enable signal VREN is in the inactive state, a second switch 1166 may remain in the off state, but when the voltage regulation enable signal VREN changes to the active state, the second switch 1166 may be switched to an on state, and the first external supply power signal PWR1 may be provided to the second internal power signal IPWR2 through the second switch SW2 1166 (while the first switch SW1, 1165, remains off).

Thus, according to an example embodiment, when the current of the second external supply power signal PWR2 is insufficient during the program operation, the control block 1160 may block the second external supply power signal PWR2 through the first switch SW1 1165, but connect the first external supply power signal PWR1 to the second internal power signal IPWR2 through the second switch SW2 1166. In this manner, the control block 1160 may supplement the second internal power signal IPWR2 directly with the first external supply power signal PWR1, and the program operation (or other related operation) may be completed normally.

Similarly, during a read operation, the read voltage generator 1153 of the wordline voltage generator 1150 may generate a selected read voltage Vrd provided to the selected wordline sWL. The adjacent pass voltage generator 1152 of the wordline voltage generator 1150 may generate an adjacent pass voltage Vpass provided to the adjacent wordlines aWL. The unselected pass voltage generator 1154 may generate an unselected pass voltage Vrdps provided to the unselected wordlines uWL. The unselected pass voltage Vrdps may be set lower than the adjacent pass voltage Vpass. The selected read voltage Vrd may be set lower than the unselected pass voltage Vrdps.

According to an example embodiment, during the read operation, the control block 1160 may detect whether the second external supply power signal PWR2 is insufficient. The control block 1160 may include the current detector 1163 and the detection signal locker 1164. When a current of the second external supply power signal PWR2 is smaller than a reference current, the current detector 1163 may generate a current shortage detection signal DET, and the detection signal locker 1164 may generate a voltage regulation enable signal VREN based on the current shortage detection signal DET.

And, when the current of the second external supply power signal PWR2 is insufficient during the read operation, the control block 1160 may block the second external supply power signal PWR2 through the first switch SW1 1165, and connect the first external supply power signal PWR1 to the second internal power signal IPWR2 through the second switch SW2 1166, as described hereinabove. In this manner, the control block 1160 may supplement the second internal power signal IPWR2 with the first external supply power signal PWR1, and the read operation may be performed normally.

Figure 9:
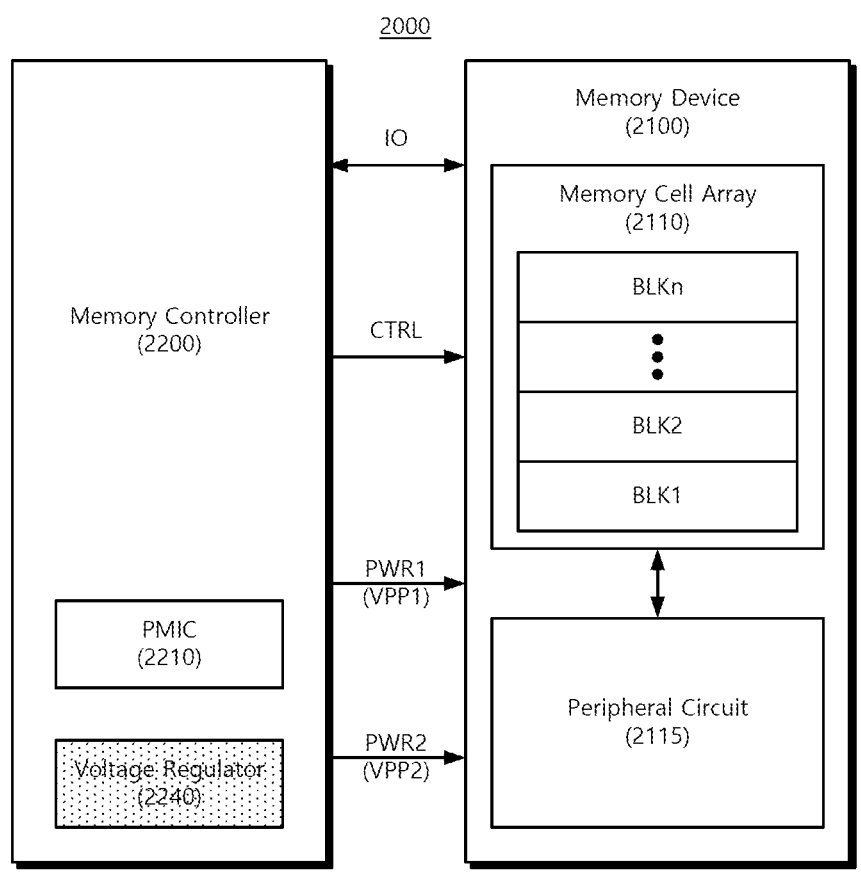
FIG. 9 is a block diagram illustrating a storage device according to another example embodiment of the present disclosure.
Figure 10:
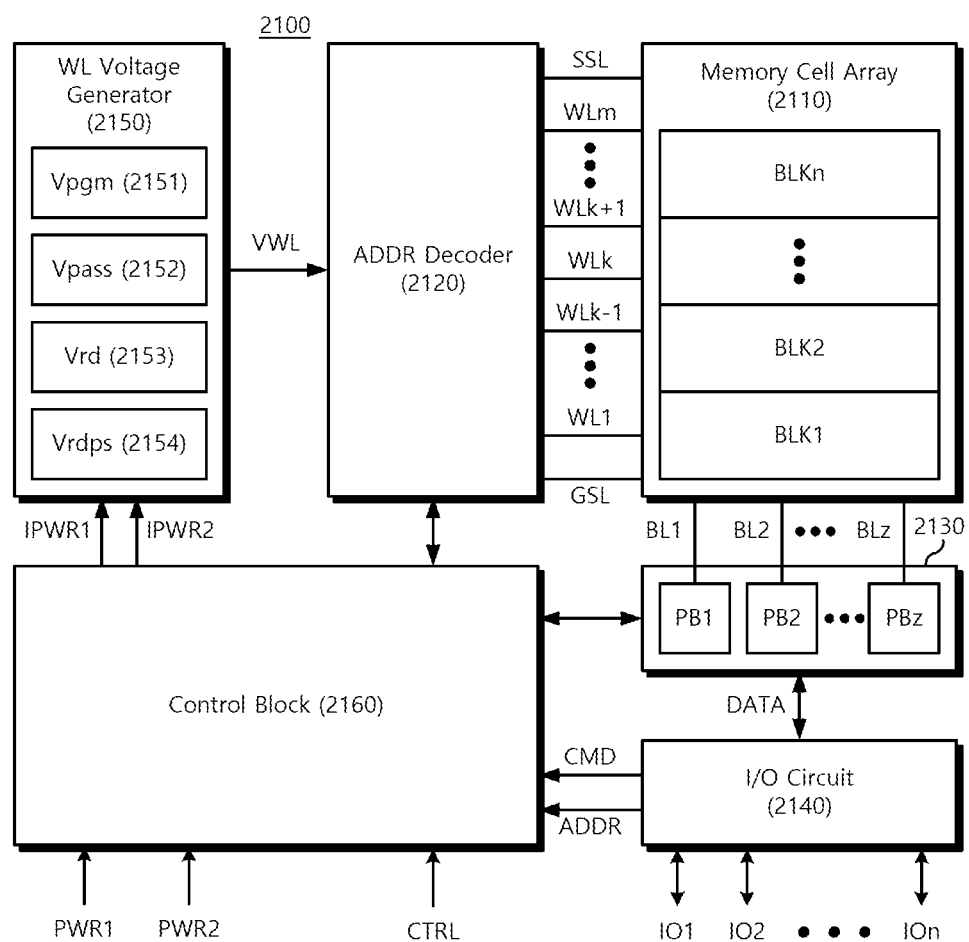
FIG. 10 is a block diagram illustrating the memory device illustrated in FIG. 9.

FIG. 9 is a block diagram illustrating a storage device according to another example embodiment of the present disclosure; and FIG. 10 is a block diagram illustrating the memory device illustrated in FIG. 9. Referring to FIGS. 9 and 10, a storage device 2000 may include a memory device 2100 and a memory controller 2200. The configuration and features of the memory device 2100 may be the same or similar to those of the memory device 1100 of FIG. 2. Accordingly, description of the configuration and characteristics of the memory device 2100 that is the same or similar to the memory device 1100 of FIG. 2 will be omitted. The configuration and features of the memory controller 2200 may be the same or similar to those of the memory device 1100 of FIG. 1. Accordingly, description of the configuration and features of the memory controller 2200 that is the same or similar to the memory controller 1200 of FIG. 1 will be omitted.

According to an example embodiment, the memory controller 2200 may include a power management circuit 2210. The power management circuit 2210 may output a first supply power signal PWR1 and a second supply power signal PWR2. The first supply power signal PWR1 and the second supply power signal PWR2 may be provided to the memory device 2100. The memory controller 2200 may include a voltage regulator 2240. The voltage regulator 2240 may supply additional power to the second supply power signal PWR2 based on the first supply power signal PWR1 when a current of the second supply power signal PWR2 is insufficient.

Figure 11:
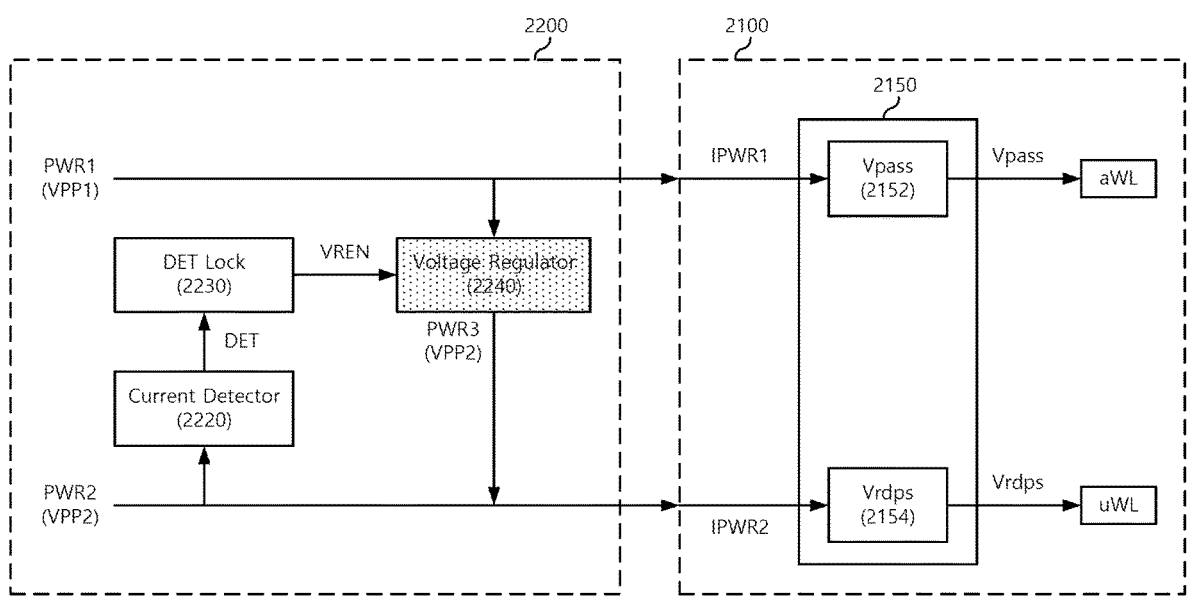
FIG. 11 is a diagram illustrating an example of a power supplement operation during a program operation or a read operation in the storage device of FIG. 9.

FIG. 11 is a diagram illustrating an example of a power supplement operation during a program operation or a read operation in the storage device of FIG. 9. Referring to FIGS. 9 to 11, the power management circuit 2210 of the memory controller 2200 may output the first supply power signal PWR1 and the second supply power signal PWR2. The memory controller 2200 may transmit the first supply power signal PWR1 to the memory device 2100 through a first power output pad. The memory controller 2200 may transmit the second supply power signal PWR2 to the memory device 2100 through a second power output pad. The first supply power signal PWR1 may be provided to a first internal power signal IPWR1 of the memory device 2100. The second supply power signal PWR2 may be provided to a second internal power signal IPWR2 of the memory device 2100. The first supply power signal PWR1 may have a first supply power voltage VPP1 (for example, 11V). The second supply power signal PWR2 may have a second supply power voltage VPP2 (for example, 8V) which is lower than the first supply power voltage VPP1.

According to an example embodiment, during a program operation, a program voltage generator 2151 of a wordline voltage generator 2150 may generate a program voltage Vpgm provided to a selected wordline sWL. An adjacent pass voltage generator 2152 of the wordline voltage generator 2150 may generate an adjacent pass voltage Vpass provided to adjacent wordlines aWL. An unselected pass voltage generator 2154 of the wordline voltage generator 2150 may generate an unselected pass voltage Vrdps provided to unselected wordlines uWL. The unselected pass voltage Vrdps may be set lower than the adjacent pass voltage Vpass.

According to an example embodiment, during the program operation, the memory controller 2200 may detect whether a current of the second supply power signal PWR2 is insufficient. The memory controller 2200 may include a current detector 2220 and a detection signal locker 2230. When the current of the second supply power signal PWR2 becomes smaller than a reference current, the current detector 2220 may generate a current shortage detection signal DET. The detection signal locker 2230 may transmit a voltage regulation enable signal VREN to the voltage regulator 2240 based on the current shortage detection signal DET.

In addition, when the current of the second supply power signal PWR2 is insufficient during the program operation, the memory controller 2200 may supplement the second supply power signal PWR2 based on the first supply power signal PWR1. For example, when the voltage regulation enable signal VREN is not received, the voltage regulator 2240 may remain in an off state. When receiving the voltage regulation enable signal VREN, the voltage regulator 2240 may be changed to an on state. When switched to the on state, the voltage regulator 2240 may generate a third supply power signal PWR3 based on the first supply power signal PWR1, and provide the third supply power signal PWR3 to the second supply power signal PWR2. As an example, when changed to the on state, the voltage regulator 2240 may receive the first supply power signal PWR1 having the first power voltage VPP1 and output the third supply power signal PWR3 having the second power voltage VPP2.

According to an example embodiment, when the current of the second supply power signal PWR2 is insufficient during the program operation, the memory controller 2200 may output the third supply power signal PWR3 based on the first supply power signal PWR1. The memory controller 2200 may supplement the second supply power signal PWR2 with the third supply power signal PWR3, and the program operation may be performed normally.

According to an example embodiment, during a read operation, a read voltage generator 2153 of the wordline voltage generator 2150 may generate a selected read voltage Vrd provided to a selected wordline sWL. An adjacent pass voltage generator 1152 of the wordline voltage generator 2150 may generate an adjacent pass voltage Vpass provided to the adjacent wordlines aWL. The unselected pass voltage generator 1154 may generate an unselected pass voltage Vrdps provided to the unselected wordlines uWL. The unselected pass voltage Vrdps may be set lower than the adjacent pass voltage Vpass. The selected read voltage Vrd may be set lower than the unselected pass voltage Vrdps.

During the read operation, the memory controller 2200 may detect whether a current of the second supply power signal PWR2 is insufficient. The memory controller 2200 may include the current detector 2220 and the detection signal locker 2230. When the current of the second supply power signal PWR2 becomes smaller than a reference current, the current detector 2220 may generate a current shortage detection signal DET. The detection signal locker 2230 may transmit a voltage regulation enable signal VREN to the voltage regulator 2240 based on the current shortage detection signal DET.

Thus, when the current of the second supply power signal PWR2 is insufficient during the read operation, the memory controller 2200 may supplement the second supply power signal PWR2 based on the first supply power signal PWR1. For example, when the voltage regulation enable signal VREN is not received, the voltage regulator 2240 may remain in the off state. When receiving the voltage regulation enable signal VREN, the voltage regulator 2240 may be changed to the on state. When changed to the on state, the voltage regulator 2240 may generate the third supply power signal PWR3 based on the first supply power signal PWR1 and provide the third supply power signal PWR3 to the second supply power signal PWR2. As an example, when changed to the on state, the voltage regulator 2240 may receive the first supply power signal PWR1 having the first power voltage VPP1 and output the third supply power signal PWR3 having the second power voltage VPP2.

In summary, when the current of the second supply power signal PWR2 is insufficient during the read operation, the memory controller 2200 may generate the third supply power signal PWR3 based on the first supply power signal PWR1. The memory controller 2200 may supplement the second supply power signal PWR2 with the third supply power signal PWR3, and the read operation may be performed normally.

Figure 12:
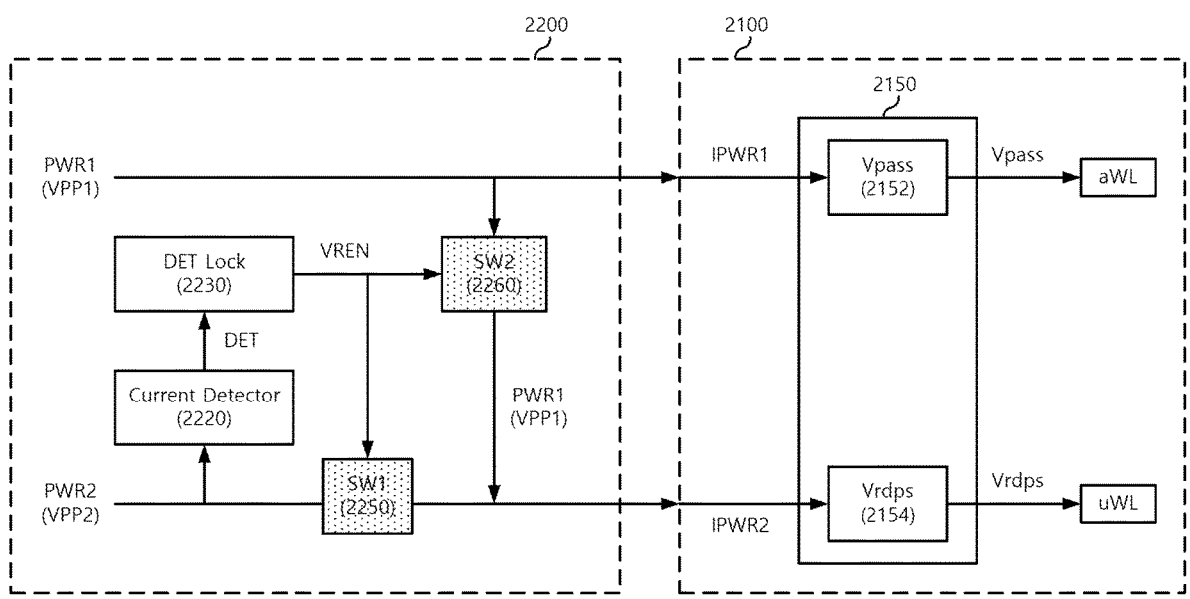
FIG. 12 is a diagram illustrating another example of a power supplement operation during a program operation or a read operation in the storage device of FIG. 9.

FIG. 12 is a diagram illustrating another example of a power supplement operation during a program operation or a read operation in the storage device of FIG. 9. Referring to FIGS. 9, 10, and 12, the power management circuit 2210 of the memory controller 2200 may output a first supply power signal PWR1 and a second supply power signal PWR2. The memory controller 2200 may transmit the first supply power signal PWR1 to the memory device 2100 through a first power output pad. The memory controller 2200 may transmit the second supply power signal PWR2 to the memory device 2100 through a second power output pad. The first supply power signal PWR1 may be provided to the first internal power signal IPWR1 of the memory device 2100. The second supply power signal PWR2 may be provided to the second internal power signal IPWR2 of the memory device 2100.

According to an example embodiment, during a program operation, a program voltage generator 2151 of a wordline voltage generator 2150 may generate a program voltage Vpgm provided to a selected wordline sWL. An adjacent pass voltage generator 2152 of the wordline voltage generator 2150 may generate an adjacent pass voltage Vpass provided to an adjacent wordlines aWL. An unselected pass voltage generator 2154 of the wordline voltage generator 2150 may generate an unselected pass voltage Vrdps provided to an unselected wordlines uWL. The unselected pass voltage Vrdps may be set lower than the adjacent pass voltage Vpass.

In addition, during a program operation, the memory controller 2200 may detect whether a current of the second supply power signal PWR2 is insufficient. The memory controller 2200 may include a current detector 2220 and a detection signal locker 2230. When the current of the second supply power signal PWR2 becomes smaller than a reference current, the current detector 2220 may generate a current shortage detection signal DET. The detection signal locker 2230 may generate a voltage regulation enable signal VREN based on the current shortage detection signal DET.

As shown, the second supply power signal PWR2 may be provided as the second internal power signal IPWR2 of the memory device 2100 through the first switch 2250. When the voltage regulation enable signal VREN is in an inactive state, the first switch 2250 may remain in an on state. When the voltage regulation enable signal VREN changes to an active state, the first switch 2250 changes to an off state, and the second supply power signal PWR2 may be blocked.

Thus, when the voltage regulation enable signal VREN is in the inactive state, the second switch 2260 may remain in the off state, but when the voltage regulation enable signal VREN changes to the active state, the second switch 2260 may be changed to the on state, and the first supply power signal PWR1 may be connected to a supply line for the second supply power signal PWR2 through the second switch 2260. At this time, the first supply power signal PWR1 may be transmitted through each of power pads corresponding to the first internal power signal IPWR1 and the second internal power signal IPWR2.

Accordingly, when the current of the second supply power signal PWR2 is insufficient during the program operation, the memory controller 2200 may block the second supply power signal PWR2 and provide the first supply power signal PWR1 to a power pad corresponding to the second internal power signal IPWR2. The first supply power signal PWR1 may be provided to both the first internal power signal IPWR1 and the second internal power signal IPWR2 of the memory device 2100, and the program operation may be performed normally.

Similarly, during a read operation, a read voltage generator 2153 of the wordline voltage generator 2150 may generate a selected read voltage Vrd provided to a selected wordline sWL. The adjacent pass voltage generator 1152 of the wordline voltage generator 2150 may generate an adjacent pass voltage Vpass provided to the adjacent wordlines aWL. The unselected pass voltage generator 1154 may generate an unselected pass voltage Vrdps provided to the unselected wordlines uWL. The unselected pass voltage Vrdps may be set lower than the adjacent pass voltage Vpass. The selected read voltage Vrd may be set lower than the unselected pass voltage Vrdps.

According to an example embodiment, during the read operation, the memory controller 2200 may detect whether a current of the second supply power signal PWR2 is insufficient. The memory controller 2200 may include the current detector 2220 and the detection signal locker 2230. When the current of the second supply power signal PWR2 becomes smaller than a reference current, the current detector 2220 may generate a current shortage detection signal DET. The detection signal locker 2230 may generate a voltage regulation enable signal VREN based on the current shortage detection signal DET.

As shown, the second supply power signal PWR2 may be provided as the second internal power signal IPWR2 of the memory device 2100 through the first switch 2250. When the voltage regulation enable signal VREN is in the inactive state, the first switch 2250 may remain in the on state. When the voltage regulation enable signal VREN changes to the active state, the first switch 2250 changes to the off state, and the second supply power signal PWR2 may be blocked.

And, when the voltage regulation enable signal VREN is in an inactive state, the second switch 2260 may remain in the off state. But, when the voltage regulation enable signal VREN changes to the active state, the second switch 2260 may be changed to the on state, and the first supply power signal PWR1 may be provided as a supply line for the second supply power signal PWR2 through the second switch 2260. At this time, the first supply power signal PWR1 may be transmitted through each of the power pads corresponding to the first internal power signal IPWR1 and the second internal power signal IPWR2.

Thus, according to an example embodiment, when the current of the second supply power signal PWR2 is insufficient during the read operation, the memory controller 2200 may block the second supply power signal PWR2 and provide the first supply power signal PWR1 to a power pad corresponding to the second internal power signal IPWR2. The first supply power signal PWR1 may be provided to both the first internal power signal IPWR1 and the second internal power signal IPWR2, and the read operation may be performed normally.

As described hereinabove with respect to multiple embodiments, it may be possible to supplement an insufficient external supply power through the remaining external power when a current of one of a plurality of external supply powers is insufficient in the memory device. Nonetheless, while the present disclosure has been described with reference to certain embodiments, it will be apparent to those of ordinary skill in the art that various changes and modifications may be made thereto without departing from the spirit and scope of the present disclosure as set forth in the following claims.

What is claimed is:

1. A memory device, comprising:
   a memory cell array electrically coupled to a plurality of wordlines including a selected wordline, an adjacent wordline, which extends adjacent the selected wordline, and an unselected wordline;
   a wordline voltage generator configured to supply: (i) a first voltage to the adjacent wordline, and (ii) a second voltage less than the first voltage to the unselected wordline, during at least one of a program operation and a read operation associated with the selected wordline; and
   a control block configured to:
      receive a first external supply power signal having a first supply power voltage and a second external supply power signal having a second supply power voltage;
      provide to the wordline voltage generator a first internal power signal at the first voltage, which corresponds to the first external supply power signal, and a second internal power signal at the second voltage, which corresponds to the second external supply power signal; and
      selectively provide additional supply power, which is derived from the first external supply power signal, to the second internal power signal when a current amount associated with the second external supply power signal decreases below a threshold current amount.

2. The memory device of claim 1, wherein the control block comprises:
   a current detector configured to generate a current shortage detection signal when the current amount is less than a reference current; and
   a detection signal locker configured to generate a voltage regulation enable signal, in response to the current shortage detection signal.

3. The memory device of claim 2, wherein the control block comprises a voltage regulator configured to provide the additional supply power to the second internal power signal when the voltage regulation enable signal is active.

4. The memory device of claim 3, wherein the voltage regulator is configured to generate the additional supply power from the first external power supply signal when the voltage regulation enable signal is in the active state, and provide the additional supply power at the second voltage to the second internal power signal.

5. The memory device of claim 2, wherein the current shortage detection signal is configured to change from an inactive state to an active state when the current amount associated with the second external supply power signal becomes less than the reference current, or change from the active state to the inactive state when the current amount becomes greater than the reference current.

6. The memory device of claim 2, wherein the voltage regulation enable signal is configured to be changed to an active state by the current shortage detection signal and then remain in the active state during the program operation or the read operation.

7. The memory device of claim 2, wherein the control block comprises:
 a first switch configured to connect the second external supply power signal to the second internal power signal based on the voltage regulation enable signal; and
 a second switch configured to connect the first external supply power signal to the second internal power signal based on the voltage regulation enable signal.

8. The memory device of claim 7, wherein the first switch is configured to maintain an on state when the voltage regulation enable signal is in an inactive state, and change to an off state when the voltage regulation enable signal changes to an active state.

9. The memory device of claim 7, wherein the second switch is configured to maintain an off state when the voltage regulation enable signal is in an inactive state, and change to an on state when the voltage regulation enable signal changes to an active state.

10. A memory device, comprising:
 an array of nonvolatile memory cells electrically coupled to a plurality of word lines;
 a wordline voltage generator configured to drive: (i) a selected word line within the array with a program voltage, (ii) a word line extending immediately adjacent the selected word line with a first voltage, and (iii) an unselected word line within the array with a second voltage having a magnitude less than a magnitude of the first voltage, during a memory cell program operation; and
 a control block configured to:
  drive the wordline voltage generator with a first internal power signal having a first magnitude, in response to a first external supply power signal;
  drive the wordline voltage generator with a second internal power signal having a second magnitude less than the first magnitude, in response to a second external supply power signal; and
  selectively redirect power from the first external supply power signal to the second internal power signal, in response to detecting a reduction in current and/or voltage associated with the second external power signal that exceeds a threshold amount.

11. The memory device of claim 10, wherein the first magnitude is equivalent to the first voltage, and the second magnitude is equivalent to the second voltage.

12. The memory device of claim 10, wherein the control block comprises a voltage regulator, which maintains a voltage of the second internal power signal at the second magnitude in response to an enable signal generated in response to the detection of a reduction in the current and/or voltage.

13. A storage device, comprising:
 a memory device configured to include a selected wordline, an adjacent wordline adjacent to the selected wordline, and an unselected wordline, and provide a first voltage corresponding to a first internal power to the adjacent wordline during a program operation or read operation, and provide a second voltage corresponding to a second internal power to the unselected wordline; and
 a memory controller configured to provide a first supply power corresponding to the first internal power and a second supply power corresponding to the second internal power to the memory device;
 wherein the memory controller is configured to provide additional supply power generated based on the first supply power to an output pad of the second supply power when a current amount of the second supply power decreases as smaller than a specified amount during a program operation or read operation.

14. The storage device of claim 13, wherein the memory controller comprises:
 a current detector configured to generate a current shortage detection signal when the current of the second supply power is less than a reference current; and
 a detection signal locker configured to generate a voltage regulation enable signal related to generating the additional supply power based on the current shortage detection signal.

15. The storage device of claim 14, wherein the memory controller comprises a voltage regulator configured to provide the additional supply power to the second supply power based on the voltage regulation enable signal.

16. The storage device of claim 14, wherein the voltage regulator is configured to lower a voltage of a first external supply power to generate the additional supply power having the second supply power voltage when the voltage regulation enable signal is in an active state.

17. The storage device of claim 14, wherein the memory controller comprises:
 a first power output pad configured to output the first supplied power;
 a second power output pad configured to output the second supplied power;
 a first switch configured to connect the second supply power to the second power output pad based on the voltage regulation enable signal; and
 a second switch configured to connect the first supply power to the second power output pad based on the voltage regulation enable signal.

18. The storage device of claim 17, wherein the first switch is configured to maintain an on state when the voltage regulation enable signal is in an inactive state, and change to an off state when the voltage regulation enable signal changes to an active state.

19. The storage device of claim 17, wherein the second switch is configured to maintain an off state when the voltage regulation enable signal is in an inactive state, and change to an on state when the voltage regulation enable signal changes to an active state.

\* \* \* \* \*